United States Patent [19]

Church et al.

[11] Patent Number: 5,531,017

[45] Date of Patent: Jul. 2, 1996

[54] THIN FILM MAGNETIC HEAD FABRICATION METHOD

[75] Inventors: Mark A. Church; Annayya P. Deshpande, both of San Jose; Alain M. Desouches, Santa Cruz, all of Calif.

[73] Assignee: International Business Machines Corporation, Armonk, N.Y.

[21] Appl. No.: 579,466

[22] Filed: Dec. 27, 1995

Related U.S. Application Data

[63] Continuation of Ser. No. 195,411, Feb. 14, 1994, abandoned.

[51] Int. Cl.$^6$ ................................................. G11B 5/127
[52] U.S. Cl. ................................. 29/603.12; 29/603.17
[58] Field of Search ..................... 29/603, 423, 603.09, 29/603.12, 603.16, 603.17; 437/226, 227

[56] References Cited

U.S. PATENT DOCUMENTS

| | | | |
|---|---|---|---|
| 4,251,841 | 2/1981 | Jacobs | 360/122 |
| 4,333,229 | 6/1982 | Ellenberger | 29/603 |
| 4,549,238 | 10/1985 | Ertingshausen et al. | 360/103 |
| 4,689,877 | 9/1987 | Church | 29/603 |
| 4,914,868 | 4/1990 | Church et al. | 51/165.71 |
| 5,095,613 | 3/1992 | Hussinger et al. | 29/603 |
| 5,177,860 | 1/1993 | Yura et al. | 29/603 |
| 5,203,119 | 4/1993 | Cole | 51/165.77 |
| 5,206,181 | 4/1993 | Gross | 437/226 X |
| 5,321,882 | 6/1994 | Zarouri et al. | 29/603 |
| 5,340,772 | 8/1994 | Rosstker et al. | 437/226 |
| 5,406,694 | 4/1995 | Ruiz | 29/603 |

FOREIGN PATENT DOCUMENTS

| | | | |
|---|---|---|---|
| 0268859 | 6/1988 | European Pat. Off. | 437/226 |
| 0463765A2 | 2/1992 | European Pat. Off. | |
| 4-315446 | 11/1992 | Japan | 437/226 |

OTHER PUBLICATIONS

"Floating Thin Film Head Fabricated by Ion Etching Method" by T. Nakanishi, K. Kogure, T. Toshima and K. Yanagisawa, *IEE Transactions on Magnetics,* vol. Mag.–16, No. 5 (Sep. 1980).

*Primary Examiner*—S. Thomas Hughes
*Attorney, Agent, or Firm*—Baker, Maxham, Jester & Meador

[57] ABSTRACT

A novel thin film magnetic head fabrication process is provided for fabricating a plurality of thin film magnetic head elements. The process begins with the selection of an appropriate wafer substrate of suitable size and quality. At least two primary sub-areas of the wafer substrate are designated as work areas for the deposition of magnetic recording transducer elements. The work areas have first and second end portions and are arranged in mutually adjacent relation along a shared boundary zone that extends in a first direction through the wafer substrate between the first and second end portions. The wafer substrate is populated with plural rows of magnetic recording transducer elements in the designated work areas such that the plural rows extend in a second direction that is substantially perpendicular to the first direction. The work areas are separated from the wafer substrate and magnetic transducer slider elements are fabricated from the plural rows of magnetic recording transducer elements. The process steps are such that they reduce the number of fabrication steps to a minimum while increasing the consistency of throat and stripe heights.

30 Claims, 6 Drawing Sheets

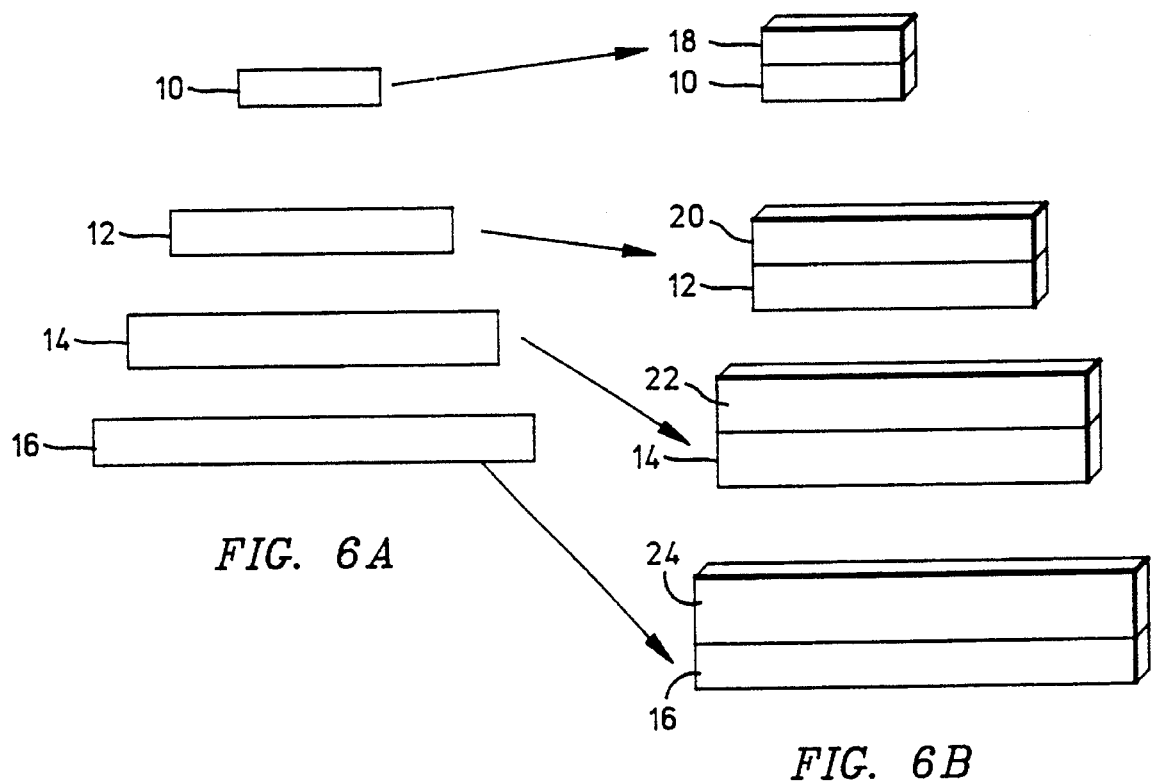
FIG. 6A
FIG. 6B
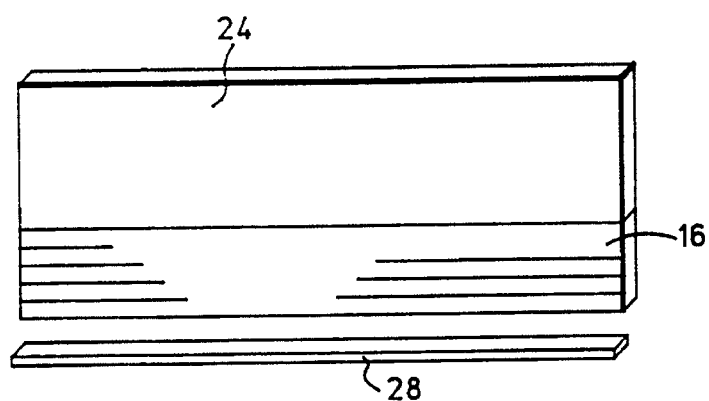
FIG. 6C

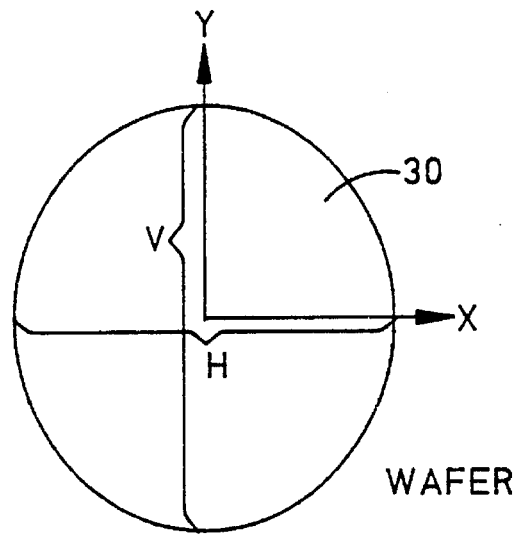
FIG. 7A
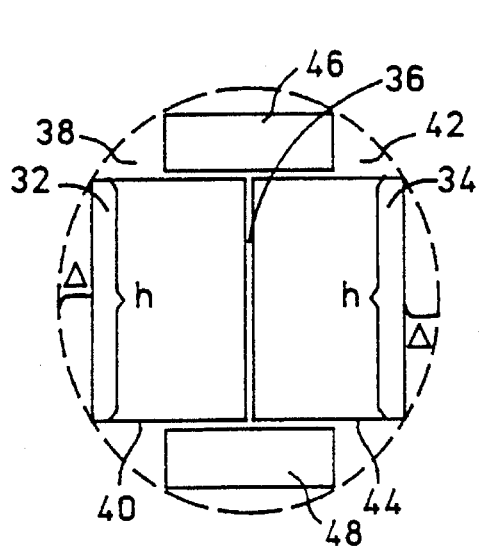
FIG. 7B
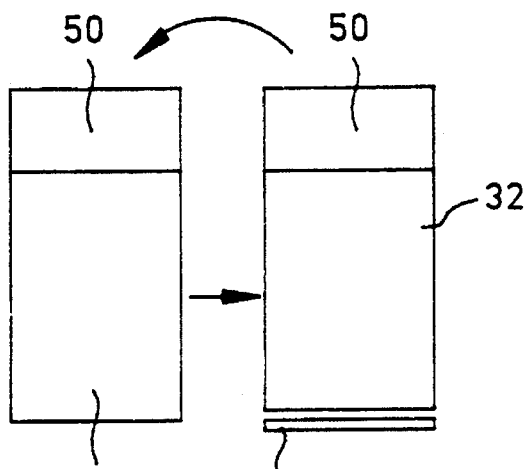
FIG. 7C
FIG. 7D
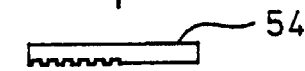
FIG. 7E
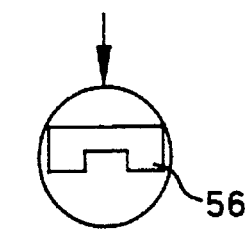
FIG. 7F

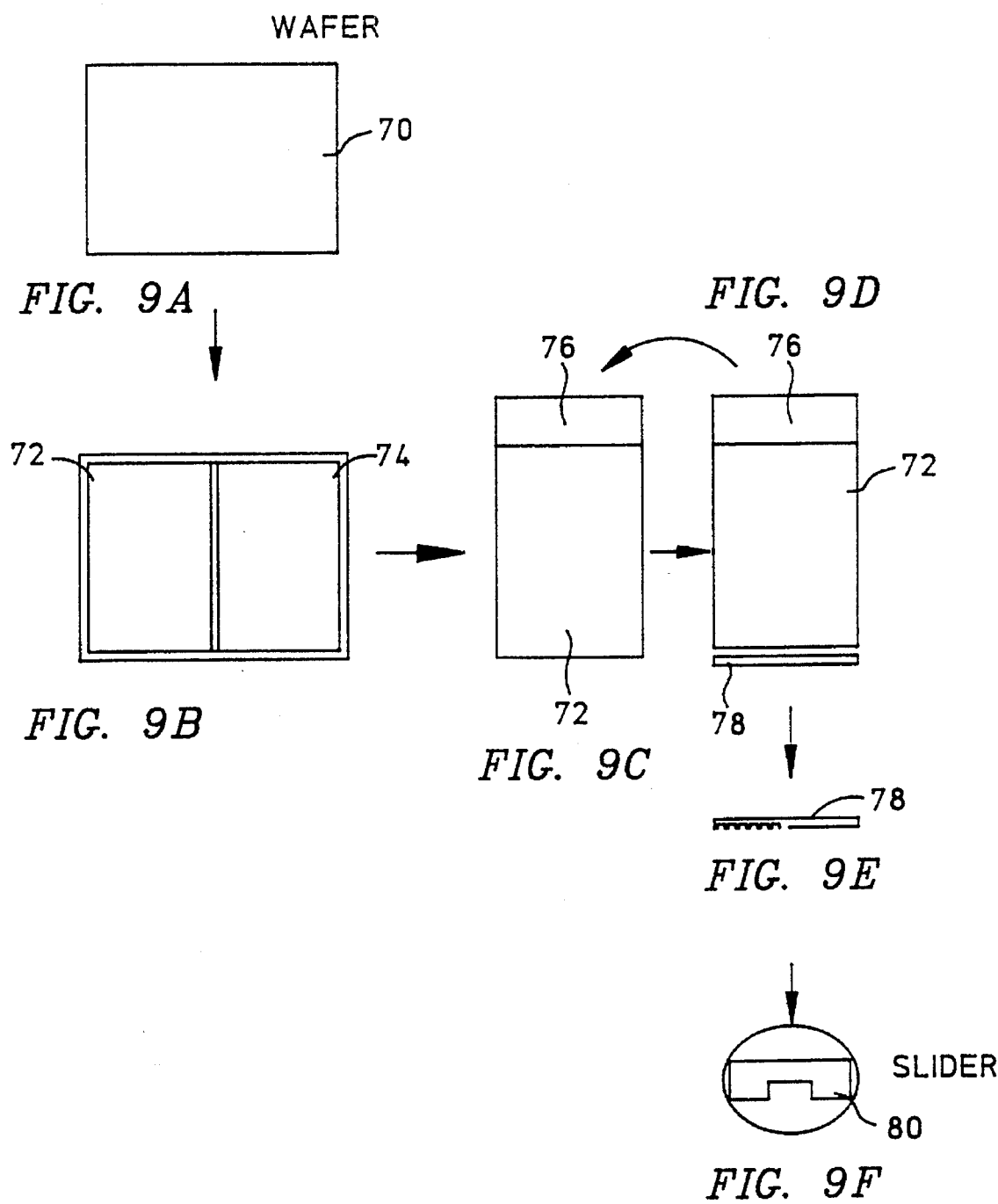

THIN FILM MAGNETIC HEAD FABRICATION METHOD

This application is a continuation of application Ser. No. 08/195,411, filed Feb. 14, 1994, now abandoned.

BACKGROUND OF THE INVENTION

1. Field of the Invention

The present invention is directed to tooling systems and methods whereby thin film magnetic recording head wafers are fabricated into optimum size work pieces to eliminate high impact process steps while minimizing wafer stress-related colinearity distortion of rows of magnetic transducers.

2. Description of the Related Art

Many direct access storage device manufacturers employ thin film magnetic recording heads. In manufacturing such heads, rows of magnetic recording transducers are deposited simultaneously on wafer substrates using semiconductor type process methods. Subsequent to these depositions, the wafers are fabricated into rows of single element heads called slider rows. When separated from the slider rows, each slider contains magnetic read/write components and an air-bearing surface configured to aerodynamically "fly" over the surface of a spinning magnetic disk medium. FIG. 1 illustrates two back-to-back slider rows and an individual slider formed therefrom in accordance with conventional techniques. The slider air-bearing surface "A" has a slight crown angle that imparts aerodynamic properties.

The slider rows are bonded to tool blocks called transfer tools. Transfer tools provide a mechanism for holding the row of sliders while lapping or grinding operations are performed to produce an air bearing surface. Typically the slider rows distort from a colinear line according to the internal stress of the wafer material and the surface stresses developed when reducing the wafers to slider rows. Further distortion of the rows of sliders from a colinear line can occur as a result of the tool bonding operation. The combined stress distortion and bonding distortion of slider rows results in a total distortion or curvature condition called row bow. This row bow condition can detrimentally affect critical head performance parameters. For those skilled in the art of thin film magnetic head fabrication, the critical performance parameters which can be affected are commonly known as stripe height in mageto-resistive heads and throat height in inductive heads. As implied by their nomenclature, it is the height of each that must be tightly controlled for optimum performance. Since row bow forms a curvature of the row of magnetic transducers, stripe heights and throat heights can be degraded by its extent. Further, all known methods to contain row bow error or compensate for it are done so at the expense of yield compromise or increased product cost.

It is, therefore, a prime objective in the fabrication of thin film magnetic heads to provide a tooling system and method which reduce row bow to negligible levels. Negligible levels are defined as submicron row bow variability (e.g. 0 microns<row bow tolerance<1.0 microns). By reducing the row bow effect to this extent and employing state of the art electrical lapping technology, magnetic performance is improved by way of improved stripe height and throat height variability. A second manufacturing objective is to achieve the prime objective by providing tooling and processes which are reduced in complexity to minimize cost. A third manufacturing objective is to achieve the prime objective while further reducing cost by maximizing the practical utilization of wafer area to increase productivity. A fourth manufacturing objective is to achieve the prime objective while providing a system for the production of "nano" and "pico" sliders where extreme row bow is anticipated in single row lapping systems.

Methods and systems have been disclosed whereby row bow is corrected by means of a transfer tool with a deflecting beam that corrects for the row bow condition. One example of this type of transfer tool design can be found in U.S. Pat. No. 4,916,868. Another example is shown in U.S. Pat. No. 4,457,114. Although these apparatus can greatly improve the condition of row bow, they fall short of reducing row bow sufficiently to achieve optimum stripe height or throat height variability control.

Alternative methods to correcting beam transfer tools have been proposed in the art, and are summarized in U.S. Pat. No. 5,095,613. This patent describes several prior art approaches that are based on the concept of resisting row bow by geometric strength. This concept is best understood by viewing a row as a mechanical beam. Given a uniform mechanical load by any or all of the row bow mechanisms, the resistance to deflection is proportional to the cube of the height of the row. Therefore, increasing the height of a row, by some means, would decrease the row bow component.

One implementation of this concept is to form rows on wafers in back-to-back pairs and slice them off, as shown in FIG. 1. The rows are separated by a kerf that facilitates subsequent slicing into individual rows and provides increased beam height "H". In order to double lap the row pairs to equalize surface stresses, the row pairs are mounted on a transfer tool, as shown in FIG. 2. One side is lapped, then the pair is debonded and rebonded to lap the other side. When both sides have been lapped, the double row work piece is sliced into two rows along the kerf.

Because slicing the rows in pairs results in an increase in the height of the row beam by over twice the height of a single slider row, it was thought that the double row would resist deflections imposed by bonding, internal wafer stress and the surface stresses initially developed by lapping. However, working with a 100% "large slider" size at 0.85 mm height, this double row method improves the row bow condition but does not achieve the negligible row bow required for optimum slider processing. The sum total of the row bow deflection components exceeds the beam's deflection resistance. With ever smaller sliders being developed, including "nano sliders" (67% slider size) and "pico sliders" (30% slider size), the concept of double row lapping appears to offer little promise.

In another prior art proposal disclosed in U.S. Pat. No. 5,095,613, multiple rows are sliced from a wafer to greatly increase the beam height, as shown in FIG. 3. The multiple rows are bonded to a transfer tool, where the increase in beam height provides for the control of row bow during the bonding process. Each row is lapped and sliced from the work piece until all rows have been lapped. The transfer tool and bond joint limits the row bow condition during the lapping and slicing process. Experiments indicate that nine (9) "large slider" rows, eighteen (18) "nano slider" rows and over forty (40) "pico slider" rows are required before a significant reduction in row bow can be achieved. The major cause of row bow by this method has been found to be shared by wafer stress but dominated by the bond process. The method also requires a departure from previous fabrication methods and requires significant tooling changes.

Applicants herein have determined that the deficiencies of the multiple row method stem from the assumption that Al$_2$O$_3$-TiC wafer materials would have a low internal stress component and row bow would not exist in a full wafer. It has been found, however, that after slicing the bottom portion from a wafer, as shown in FIG. 3, the wafer stress induced distortion causes a variation in the colinearity of the row of magnetic transducers equivalent to 11.0 um of row bow. Although lower stress wafer mateddais may be available, none have been found to lower stress enough to keep the wafer from distorting or eliminate the row bow effect after removing the bottom portion of the wafer.

Applicants have experimented with alternative systems and mechanisms to mechanically compensate for stress induced wafer distortion. In one system, the top of the wafer is machined into the configuration shown in FIG. 4 by means of electro-static discharge. A mechanical device then applies load forces to distort the top of the wafer in a way that corrects for the row bow distortion. While this system was able to substantially correct for wafer distortion, it occupied the upper area of the wafer where magnetic devices could be placed. Because of this, the proposed system failed to sufficiently reduce cost by maximizing wafer utilization.

It should be evident that many factors must be taken into account in attempting to develop an alternative to single row lapping. It is naive to assume that simply increasing the height of a row beam will eliminate the row bow effect. It is also naive not to consider the manufacturing environment. Therefore, according to the objectives, environment and testing considerations defined above, conclusions can be made regarding prior art solutions.

One conclusion is that the double row lapping system is not a viable approach in the changing environment of decreasing slider size. During tests of double row lapping, it was found that a double row large slider height is not enough height to reduce the row bow to negligible levels. Considering the industry direction toward "nano" and "pico" slider sizes, the double row heights will be decreasing. Since decreasing heights is in opposition to the intent of the method, the double row height concept will not clearly solve the row bow problem and its future is limited.

Another conclusion is that the full wafer concept is not a viable approach because it does not achieve a negligible row bow component. Wafer stress according to studies and tests stated herein caused row bow effects beyond permissible levels. In order for the full wafer concept to be complete and able to achieve the negligible row bow objective, wafer material with stress specifications specific to row bow would have to be provided. Because they have not, practical implementation of this method remains out of reach.

It can be further concluded that the full wafer concept is not a viable approach in achieving the third objective of thin film magnetic head fabrication. The concept requires the upper area of the wafer, as shown in FIGS. 4 and 5, to provide enough material height to resist stress, and enough material area to mechanically hold the work piece until the last row is lapped. In today's environment, population of as much wafer area as possible is essential in productivity to maintain cost competitiveness. The upper area of the wafer can contain a significant amount of product which is clearly a departure from maximum wafer utilization in the third manufacturing objective identified above.

It can be further concluded that the full wafer concept is not a viable approach in achieving the prime objective when using square wafers. As previously discussed, the full wafer concept relies on the upper area material height to maintain constant row bow and mechanically hold the work piece until the last row is lapped. Considering, once again, the third objective of maximum wafer utilization, the last row on a square wafer could be close to or the same height as a single row. If a wafer were populated to this extent, there would not be enough material to maintain constant row bow or mechanically hold the last rows of the work piece during lapping.

Accordingly, there is a need in the art for an alternative to single row, double row and full wafer lapping that can be optimized to achieve all of the competing objectives of thin film magnetic head fabrication depending on the wafer material, tool set and throat height/stripe height tolerance requirements selected. What is required is a solution that accounts for each of the individual components making up the wafer row bow condition and the impact of row bow correction efforts on the overall design objectives.

SUMMARY OF THE INVENTION

In accordance with the foregoing objectives, a novel thin film magnetic head fabrication process is provided for fabricating a plurality of thin film magnetic head elements. The process begins with the selection of an appropriate wafer substrate of suitable size and quality. At least two primary sub-areas of the wafer substrate are designated as work areas for the deposition of magnetic recording transducer elements. The work areas have first and second end portions and are arranged in mutually adjacent relation along a shared boundary zone that extends in a first direction through the wafer substrate between the first and second end portions. The wafer substrate is populated with plural rows of magnetic recording transducer elements in the designated work areas such that the plural rows extend in a second direction that is substantially perpendicular to the first direction. The work areas are separated from the wafer substrate and magnetic transducer slider elements are fabricated from the plural rows of magnetic recording transducer elements. The foregoing process eliminates manufacturing steps, and fabrication costs are reduced. The process minimizes colinearity distortion, and critical magneto-resistive stripe heights and inductive throat heights can be tightly controlled. In this way, an ultimate objective of improved magnetic performance at reduced cost is achieved.

BRIEF DESCRIPTION OF THE DRAWING

The objects, advantages and features of the present invention will be more clearly understood by reference to the following detailed disclosure and the accompanying drawing in which:

FIGS. 6A, 6B and 6C are a sequence of plan and perspective views of slider row elements prepared in accordance with a novel but nonpreferred method;

FIGS. 7A–7F are a sequence of plan and side views showing the fabrication of slider elements in accordance with a first preferred aspect of the present invention;

FIGS. 9A–9F are a sequence of plan and side views showing the fabrication of slider elements in accordance with a second preferred aspect of the present invention.

DETAILED DESCRIPTION OF THE PREFERRED EMBODIMENTS

Referring now to FIGS. 6A–6C, an idealized thin film magnetic transducer fabrication process is illustrated in which multiple magnetic slider element row groups 10, 12, 14 and 16 are defined on and separated from a generally circular wafer (not shown). Each row group has a different length to maximize wafer utilization. The row groups are respectively bonded to holders 18, 20, 22 and 24 and mounted in a fixture (not shown) for lapping and polishing. As each slider row is processed.(e.g., row 28 in FIG. 6C), it can be removed from its row group and divided into discrete slider elements.

In order for multiple row lapping as in FIGS. 6A–6C to be complete, operative and achieve the manufacturing objectives described above, certain restrictions must apply. The restrictions must be addressed according to the wafer material stress and the tooling available in the manufacturing environment. While the embodiment shown in FIGS. 6A–C with variable length rows may appear to best leverage the wafer utilization objective, it might not achieve the row bow minimization objective due to stress. Likewise, the FIGS. 6A–6C embodiment might achieve the row bow minimization objective but might not be practical in a specific manufacturing tool set.

Turning now to FIGS. 7A–7F, a progressive method of separating a wafer into smaller work pieces is illustrated as a preferred embodiment that can be optimized to achieve the manufacturing objectives described above. A circular wafer substrate 30 is, for example, 125 mm in diameter and has a thickness according to desired magnetic recording head design requirements. When viewed in plan, the wafer substrate is seen as possessing a maximum horizontal dimension "H" along the "X" axis, and a maximum vertical dimension "V" along the "Y" axis. Although various suitable wafer materials are available and could be employed, the present example contemplates wafers made from a mixture of $Al_2O_3$ and TiC in accordance with the method disclosed in U.S. Pat. No. 4,251,841. The wafer material is annealed to produce the lowest attainable material stress, and rows of magnetic transducers are deposited using conventional thin film processes in areas designated for eventual work pieces.

Figure 1:
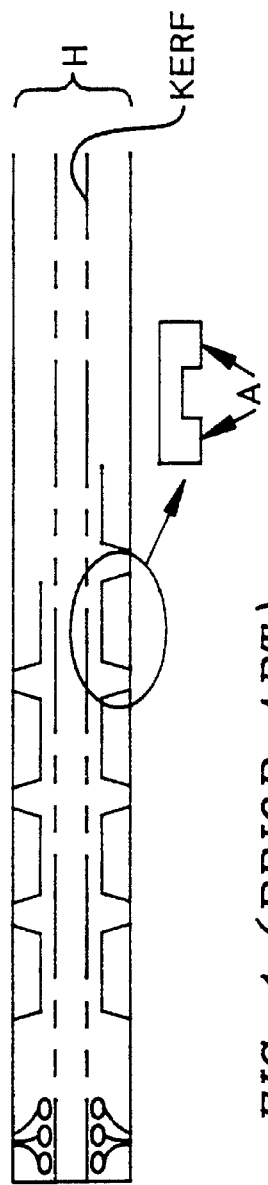
FIG. 1 is a plan view of a double slider row element prepared in accordance with a prior art method.
Figure 2:
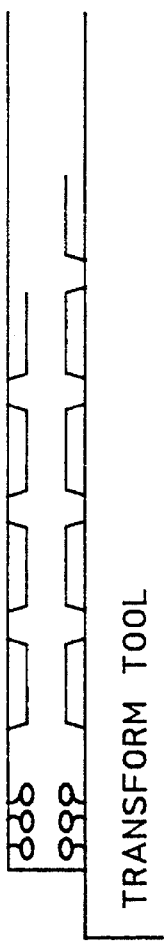
FIG. 2 is a plan view of the double slider row element of FIG. 1 mounted on a transfer tool for slider lapping and grinding operations.
Figure 3:
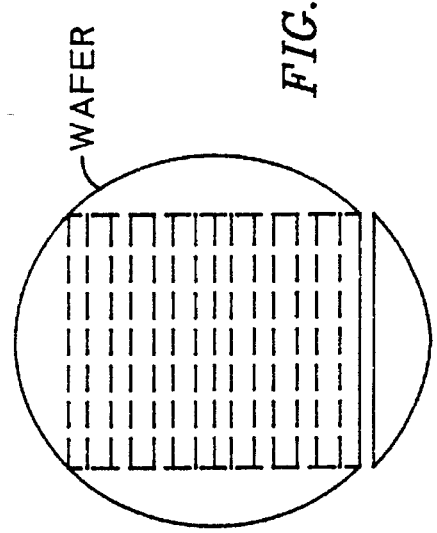
FIG. 3 is a plan view of a multiple row slider element prepared in accordance with another prior art method.
Figure 4:
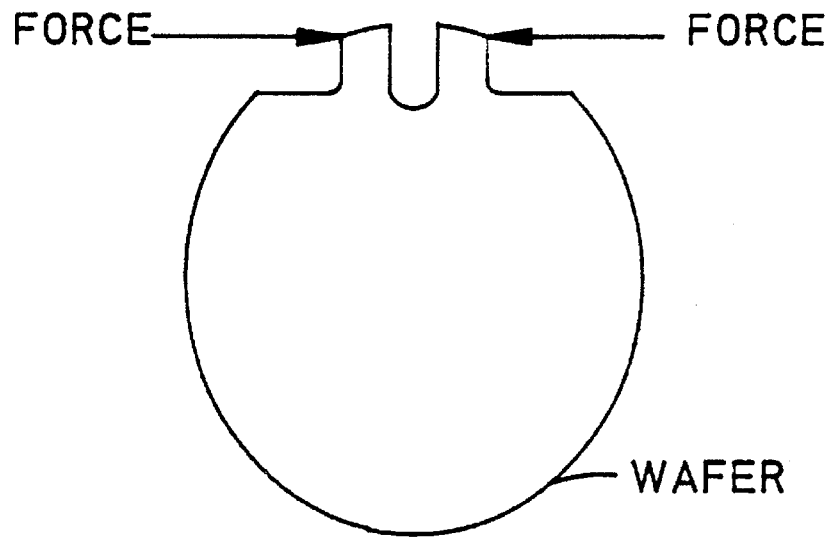
FIG. 4 is a plan view of a wafer element prepared in accordance with an experimental method developed by applicants.
Figure 5:
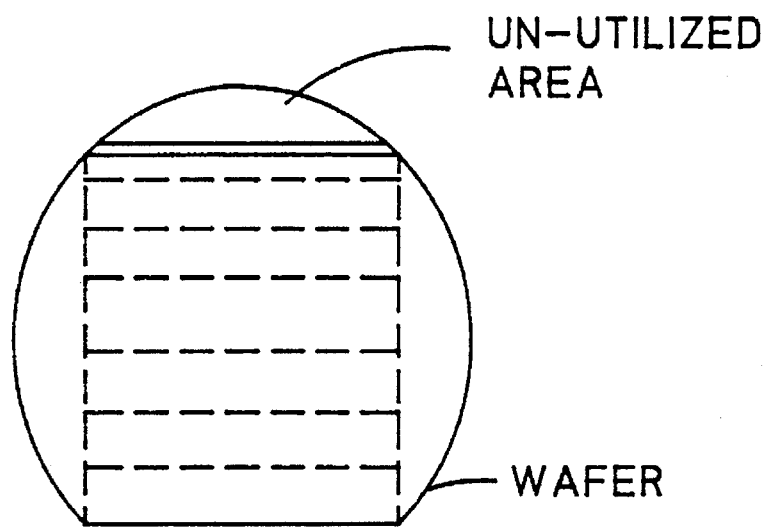
FIG. 5 is a plan view of a wafer element prepared in accordance with the prior art method of FIG. 3.
Figure 8:
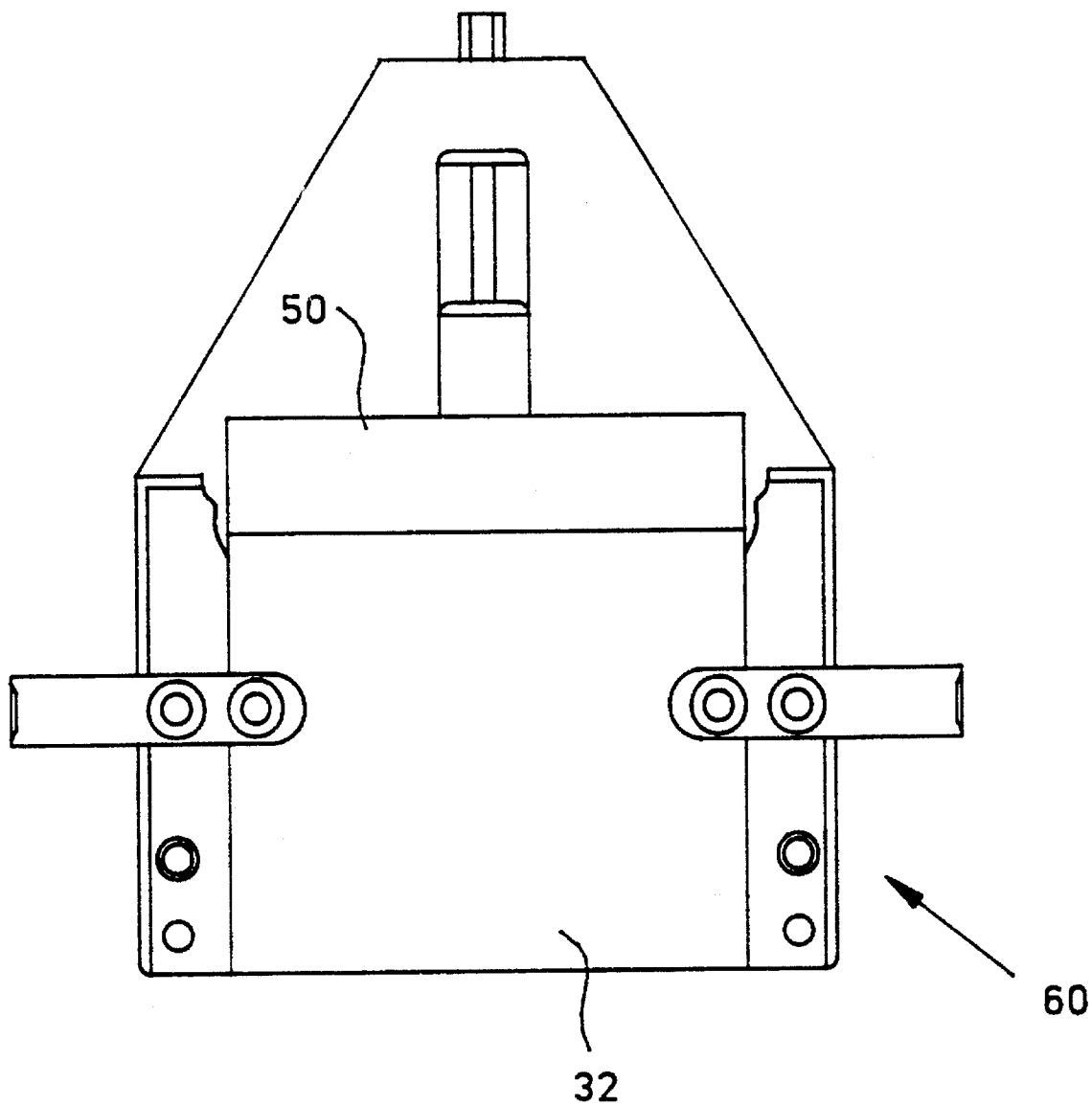
FIG. 8 is a plan view of a conventional lapping tool for holding the slider elements of FIGS. 7A–7F during lapping and grinding operations.

According to the wafer material stress of typical materials such as $Al_2O_3$-TiC, the stress induced row bow in the main body of a 125 mm diameter wafer is beyond the negligible row bow manufacturing objective. It is therefore desirable to sub-divide the main body of the wafer substrate 30 into "n" primary work piece areas where "n" is determined from the maximum horizontal dimension of the wafer substrate 30 and the maximum permissible length of a magnetic transducer slider row in order to confine the stress induced row bow to negligible levels. The value "n" is calculated by first determining the dimension "H" and subtracting the distance 2* "Δ" therefrom, where Δ represents the distance between the circumference of the wafer substrate 30 and the closest edge of the work area, given a work area height "h." The value "H–2Δ" is then divided by the maximum slider row length and rounded downwardly to the nearest integer value to determine "n." For the aforementioned $Al_2O_3$-TiC material, and using conventional fabrication equipment, as shown in FIG. 8, and an applicable throat or stripe height tolerance range of about +/–0.3–0.4 microns, it is practical to utilize work pieces that are 47 mm along the row length. Other row lengths would need to be determined for other wafer materials, tool sets and throat height/stripe height tolerance requirements. For a 125 mm diameter wafer substrate, the maximum number of primary work piece areas "n" of 47 mm row length is two. Thus, in FIG. 7B, the wafer substrate 30 is divided through its centerline in the vertical direction to reduce the stress induced bow row to negligible levels. In conformance, work pieces 32 and 34 are formed side by side, separated by a grinding kerf 36 that provides a shared boundary zone extending in the "Y" axis direction between the vertical ends 38, 40, 42 and 44 of the primary work piece areas. These vertical ends of the primary work pieces are vertically maximized to extend from the horizontal centerline of the wafer 30 to a distance that coincides with the wafer circumference.

To further achieve the objective of maximum space efficiency, wafer utilization must be leveraged. Therefore, secondary work piece areas such as the upper work piece area 46 and the lower work piece area 48 must be formed. In the embodiment of FIGS. 7A–7F, 47 mm work pieces 46 and 48 are formed along the vertical centerline of the wafer and placed adjacent to the ends of primary work pieces 32 and 34. The upper and lower corners of the work pieces 46 and 48 are respectively located to closely coincide with the circumferential edge at the upper and lower portions of the wafer substrate 30.

Rows of magnetic transducers are efficiently populated in the primary work piece areas 32 and 34 and the secondary work piece areas 46 and 48 using conventional fabrication techniques. They are oriented in "X" axis direction. The magnetic transducer rows are populated at a sufficient row pitch to resist material stress induced row bow after the rows are separated from the wafer during subsequent processing.

After the work pieces have been formed, they are sequentially separated from the wafer substrate 30. It is then necessary to bond each work piece to a wafer extension tool, such as the tool 50 in FIGS. 7C and 7D, using a fast drying adhesive. In the preferred embodiment, a cyano-acrylate adhesive is used without heat curing. The purpose of the wafer extension tool 50 is to hold the row bow of each multiple row work piece constant, as each row 54 is lapped, until the last row is lapped. Another equally important purpose of the tool 50 is to extend the work piece and provide for holding the last rows of the work piece in a lapping fixture.

After the multiple row work pieces 32, 34, 46 and 48 are separated for the wafer substrate 30 and bonded to tools, the work pieces are loaded into a lapping fixture 60, as shown in FIG. 8. The lapping fixture 60 is conventional in nature and supports the work piece 32 and tool 50 in accordance with known techniques. Preferably, a plurality of work pieces are mounted in a plurality of lapping fixtures 60 and simultaneously lapped on a single lapping apparatus (not shown). The lapping method consists of a typical phase one rough lap followed by a typical phase two combined finish lap and polish. The multiple row work pieces are then either taper lapped on the same lapping fixture 60 or removed therefrom and transferred to a separate tapering fixture (not shown). Both methods have been practiced by applicants and the latter of the two is preferred.

Once tapered, the multiple row work pieces are placed in a grinding apparatus (not shown) equipped with a grinding fixture and vision system. Each row, having been lapped and tapered, is separated by grinding from the work piece in such a way that the next row of the multiple row work piece is ready to be mounted in the fixture 60 and lapped as described above. Because row bow is virtually eliminated, maximum material can be removed leaving only one lapping operation to complete the air bearing surface. As compared to single row processes, a rough lapping operation to eliminate bulk material, before final air bearing surface lapping, is eliminated.

The process of lapping each row of the work piece, then tapering each row and separated it by grinding is repeated until the last row is lapped. As the processing approaches the last row to be lapped, the bonded tool 50 becomes an extension of the wafer to hold the bow constant and provide a mechanism for holding the rows in the lapping fixture. The last row is finally debonded from the extension tool after final air bearing surface lapping for the work piece is complete.

It has been found that $Al_2O_3$-TiC substrate material, when machined with composite grinding wheels, produces a differential surface stress. The surface stress differential is formed by the difference in surface damage caused by the lapping process on the air bearing side, and the damage caused by the grinding wheel on the opposite side. This difference in stress, typically causes a distortion in the air bearing surface. The distortion generally manifests itself in the crown component of the slider, where it forms a negative shift in crown. Since it is more desirable to have positive crown for better head to disk wear, a supplemental lapping process has been developed to shift the crown to a positive state.

In the supplemental lapping process, individual magnetic transducer slider rows are placed in a conventional lapping tool (not shown) so that the side damaged by grinding can be lapped. The process is set up to remove the entire damaged layer and to provide a surface finish which is closely matched to the air bearing surface. By matching the damaged layer with the air bearing surface, the surface stresses are equal and cancelled. By this mechanism, the crown will return to a nominal undeformed state. Alternatively, the same method of controlling the amount of damage on the grinding side can be used to adjust the flatness of the air bearing. While this method has been practiced, the preferred process, tool set and wafer material, requires equalizing the surface finishes as much as possible to produce the desired positive crown control.

Once the supplemental lapping process step is completed, patterned air bearings are abraded into the slider row using reactive ion etching technology, or the like, followed by conventional parting by machine grinding methods to form discrete slider elements 56, as shown in FIG. 7. Further crown adjustment may be performed as desired. Although the preferred embodiment consists of a patterned air bearing, machine rails could be employed as an alternative.

The above-described preferred embodiment has been found to best satisfy the manufacturing objectives described above. Given a different wafer material, tool set and applicable throat height/slider height tolerance limitations, the division of the wafer might be better utilized in some alternative fashion to increase productivity and reduce cost. For example, the value of "n" might be three, four or some other value, particularly, if very tight throat or slider height tolerances, e.g., +/−0.2 microns or less, are employed. If the value of "n" is three, the vertical dimension of the central primary work area might be extended to nearly the full dimension "V" of the wafer substrate. Additionally, two secondary work areas might be formed on each side of the central primary work area in order to fully utilize the wafer area.

In the same way, square wafers might be a way of better utilizing the wafer area for increased productivity and reduced cost. FIGS. 9A–9F show a progression of separating a square wafer 70 into multiple work pieces.. Without knowledge of the stress components of square wafers, but assuming the wafer stress induced row bow is similar to that of the round wafer 30, a 100–125 mm wafer could be completely populated with rows of magnetic transducers, divided into two 47 mm primary work pieces 72 and 74 together with side areas used to facilitate manufacturing operations. With extension tools 76 bonded to the work pieces, the fabrication process steps described above would then be used to perform the reduction from work pieces 72 and 74 to individual slider rows 78 to finished sliders 80.

Accordingly, a multiple row fabrication method for thin film magnetic transducers has been disclosed. The method provides a way of achieving the prime objective of negligible row bow by managing row configuration and maintaining row bow constant during the process of lapping. A second objective of reduced cost is achieved by the elimination or significant reduction of process steps such as bulk material rough lapping prior to final lap and reducing the single row bond process from 100% row bond per wafer to bonding as few as four multiple work pieces per wafer. Further, cost reduction is achieved by providing a way of fully populating any size or shape of wafer for maximum wafer utilization and maximum wafer productivity. All of these objectives are achieved while meeting the objective of facilitating reductions in slider size. While several preferred embodiments have been shown and described, it should be understood that modifications and adaptations thereof will occur to persons skilled in the art. Therefore, the protection afforded the invention should not be limited except in accordance with the spirit of the following claims and their equivalents.

We claim:

1. A method for fabricating a plurality of thin film magnetic head elements, comprising the steps of:

selecting a wafer substrate of suitable size and quality;

determining a width dimension which is not substantially less than a maximum permissible row length that is attainable without exceeding an acceptable level of row bow in rows of magnetic transducer elements to be formed on said wafer substrate;

designating at least two primary sub-areas of said wafer substrate as work areas for the deposition of magnetic recording transducer elements, said work areas having said width dimension and a length dimension extending between first and second end portions thereof, and said work areas further being in mutually adjacent relation along a shared boundary zone extending in a first direction through said wafer substrate between said first and second end portions;

populating said wafer substrate with plural rows of magnetic recording transducer elements in said designated work areas, said plural rows extending in a second direction that is substantially perpendicular to said first direction; and separating said work areas from said wafer substrate and fabricating magnetic transducer slider elements from said plural rows of magnetic recording transducer elements.

2. The method of claim 1 wherein said wafer substrate is generally circular and at least two secondary sub-areas are designated adjacent said first and second end portions of said primary sub-areas.

3. The method of claim 1 wherein said wafer substrate is generally rectangular.

4. The method of claim 1 wherein two primary sub-areas are designated.

5. The method of claim 2 wherein two primary sub-areas and two secondary sub-areas are designated.

6. The method of claim 1 wherein said slider element fabrication step includes mounting each of said primary sub-areas on a tool and sequentially lapping and removing each of said magnetic transducer rows from the remaining rows of said mounted primary sub-areas.

7. The method of claim 6 wherein said slider element fabrication step further includes mounting each of said primary sub-areas on a tool and simultaneously lapping the rows thereof on a single lapping tool.

8. The method of claim 6 wherein said lapping step includes performing a first phase rough lapping step followed by a second phase combination lapping and polishing step.

9. The method of claim 1 wherein said fabrication step includes a primary lapping step followed by a secondary taper lapping step.

10. The method of claim 9 wherein said primary and secondary lapping steps are performed by mounting said primary sub-areas on a tool.

11. The method of claim 9 wherein said primary lapping step is performed by mounting said primary sub-areas on a first tool and said secondary lapping step is performed by mounting said primary sub-areas on a second tool.

12. The method of claim 6 wherein said slider element fabrication step further includes back-lapping each of said magnetic transducer rows following removal from the remaining rows.

13. The method of claim 1 wherein said wafer substrate is formed from $Al_2O_3$-TiC.

14. The method of claim 1 wherein said magnetic transducer rows are no more than about 47 mm in length.

15. A method for fabricating a plurality of thin film magnetic head elements, comprising the steps of:

selecting a wafer substrate of suitable size and shape, said wafer substrate having a horizontal "H" dimension in a horizontal "X" direction and a vertical "V" dimension in a "Y" direction, when viewed in plan;

determining a maximum permissible row length that is attainable without exceeding an acceptable level of row bow in rows of magnetic transducer slider elements to be formed on said wafer substrate;

designating "n" primary sub-areas of said wafer substrate as work areas for the deposition of magnetic recording transducer elements, where "n" is determined as a number of maximum permissible row lengths that will fit within the "H" dimension of said water substrate, said work areas having first and second end portions and being in mutually adjacent relation along "n-1" shared boundary zones extending in said "Y" direction and between said first and second end portions;

populating said wafer substrate with plural rows of magnetic recording transducer elements in said designated work areas, said plural rows extending in said "X" direction; and separating said work areas from said wafer substrate and fabricating magnetic transducer slider elements from said plural rows of magnetic recording transducer elements.

16. The method of claim 15 further including the step of determining, for each primary sub-area, a maximum vertical dimension that will fit within the "V" dimension of said wafer substrate.

17. The method of claim 15 wherein said wafer substrate is generally circular and at least two secondary sub-areas are designated adjacent said first and second end portions of said primary sub-areas.

18. The method of claim 15 wherein said wafer substrate is generally rectangular.

19. The method of claim 15 wherein two primary sub-areas are designated.

20. The method of claim 17 wherein two primary sub-areas and two secondary sub-areas are designated.

21. The method of claim 15 wherein said slider element fabrication step includes mounting each of said primary sub-areas on a tool and sequentially lapping and removing each of said magnetic transducer rows from the remaining rows of said mounted primary sub-areas.

22. The method of claim 21 wherein said slider element fabrication step further includes mounting each of said primary sub-areas on a tool and simultaneously lapping the rows thereof on a single lapping tool.

23. The method of claim 21 wherein said lapping step includes performing a first phase rough lapping step followed by a second phase combination lapping and polishing step.

24. The method of claim 15 wherein said fabrication step includes a primary lapping step followed by a secondary taper lapping step.

25. The method of claim 24 wherein said primary and secondary lapping steps are performed by mounting said primary sub-areas on a tool.

26. The method of claim 24 wherein said primary lapping step is performed by mounting said primary sub-areas on a first tool and said secondary lapping step is performed by mounting said primary sub-areas on a second tool.

27. The method of claim 21 wherein said slider element fabrication step further includes back-lapping each of said magnetic transducer rows following removal from the remaining rows.

28. The method of claim 15 wherein said wafer substrate is formed from $Al_2O_3$-TiC.

29. The method of claim 15 wherein said magnetic transducer rows are no more than about 47 mm in length.

30. A method for fabricating a plurality of thin film magnetic head elements, comprising the steps of:

selecting a wafer substrate of suitable size and quality;

determining a width dimension which is not substantially less than a maximum permissible row length that is attainable without exceeding an acceptable level of row bow in rows of magnetic recording transducer elements to be formed on said wafer substrate;

designating at least two primary sub-areas of said wafer substrate as work areas for the deposition of magnetic recording transducer elements, said work areas having said width dimension and a length dimension extending between first and second end portions thereof, and said primary sub-areas further being in mutually adjacent relation along a shared boundary zone extending in a first direction through said wafer substrate between said first and second end portions;

populating said wafer substrate with plural rows of magnetic recording transducer elements in said designated work areas, said plural rows extending in a second direction that is substantially perpendicular to said first direction; and separating said work areas from said wafer substrate and fabricating magnetic transducer slider elements from said plural rows of magnetic recording transducer elements, said slider element fabrication step including mounting each of said primary sub-areas on a tool and simultaneously lapping the rows thereof on a single lapping tool, said lapping step including pertaining a first phase rough lapping step followed by a second phase combination lapping and polishing step, said fabrication step further including a secondary taper lapping step and a back-lapping step for each of said magnetic transducer rows following removal from the remaining rows.

* * * * *

UNITED STATES PATENT AND TRADEMARK OFFICE
CERTIFICATE OF CORRECTION

PATENT NO. : 5,531,017
DATED : July 2, 1996
INVENTOR(S) : Church et al

It is certified that error appears in the above-indentified patent and that said Letters Patent is hereby corrected as shown below:

Column 12, line 1, change "pertaining" to --performing--.

Signed and Sealed this

Twenty-fourth Day of February, 1998

Attest:

BRUCE LEHMAN

*Attesting Officer*     *Commissioner of Patents and Trademarks*